United States Patent
Chae et al.

(10) Patent No.: US 12,051,798 B2
(45) Date of Patent: Jul. 30, 2024

(54) DEPOSITION OF LITHIUM FLUORIDE ON SURFACE OF LITHIUM METAL AND LITHIUM SECONDARY BATTERY USING THE SAME

(71) Applicant: LG CHEM, LTD., Seoul (KR)

(72) Inventors: Oh-Byong Chae, Daejeon (KR); Sang-Wook Woo, Daejeon (KR); Hee-Won Choi, Daejeon (KR); Eun-Kyung Kim, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 34 days.

(21) Appl. No.: 16/330,006

(22) PCT Filed: Dec. 27, 2017

(86) PCT No.: PCT/KR2017/015589
§ 371 (c)(1),
(2) Date: Mar. 1, 2019

(87) PCT Pub. No.: WO2018/131824
PCT Pub. Date: Jul. 19, 2018

(65) Prior Publication Data
US 2020/0203714 A1    Jun. 25, 2020

(30) Foreign Application Priority Data
Jan. 11, 2017 (KR) .................. 10-2017-0004358

(51) Int. Cl.
*H01M 4/1397* (2010.01)
*H01M 4/04* (2006.01)
(Continued)

(52) U.S. Cl.
CPC ....... *H01M 4/1397* (2013.01); *H01M 4/0423* (2013.01); *H01M 4/0428* (2013.01); *H01M 4/136* (2013.01); *H01M 10/0525* (2013.01)

(58) Field of Classification Search
CPC ....... H01M 4/02–1397; H01M 4/0428; H01M 4/0423; H01M 4/136; H01M 4/023; H01M 10/0525
(Continued)

(56) References Cited

U.S. PATENT DOCUMENTS 5,989,743 A * 11/1999 Yamashita .......... H01M 50/572
429/129
6,835,492 B2    12/2004 Cho et al.
(Continued)

FOREIGN PATENT DOCUMENTS

CN    1610167 A    4/2005
CN    106159200 A    11/2016
(Continued)

OTHER PUBLICATIONS

EPO Machine translation of KR100413796 originally published to Cho Jung Geun on Jan. 3, 2004 (Year: 2004).*
(Continued)

*Primary Examiner* — Cynthia H Kelly
*Assistant Examiner* — Niara Trant
(74) *Attorney, Agent, or Firm* — Birch, Stewart, Kolasch & Birch, LLP

(57) ABSTRACT

In the case in which a lithium metal is used in order to increase the capacity of a lithium secondary battery, reversibility of charging and discharging is reduced due to dendrite, etc. A lithium metal having LiF deposited thereon exhibits high stability, whereby reversibility of charging and discharging is increased. In addition, in the case in which LiF is deposited, the lithium metal, which is a negative
(Continued)

(a)

(b)

electrode material, is not consumed, and the shape of a lithium metal electrode is not greatly changed.

6 Claims, 3 Drawing Sheets

(51) Int. Cl.
*H01M 4/136* (2010.01)
*H01M 10/0525* (2010.01)

(58) Field of Classification Search
USPC .......................................................... 429/231
See application file for complete search history.

(56) References Cited

U.S. PATENT DOCUMENTS

| | | | | |
|---|---|---|---|---|
| 6,911,280 | B1 * | 6/2005 | De Jonghe | H01M 4/5815 |
| | | | | 429/231.95 |
| 9,601,762 | B2 | 3/2017 | Wietelmann et al. | |
| 2002/0086213 | A1 | 7/2002 | Utsugi et al. | |
| 2002/0182488 | A1 | 12/2002 | Cho et al. | |
| 2003/0003364 | A1 * | 1/2003 | Mori | H01M 10/0585 |
| | | | | 429/231.95 |
| 2005/0042503 | A1 | 2/2005 | Kim et al. | |
| 2011/0111298 | A1 * | 5/2011 | Lopez | H01M 4/131 |
| | | | | 429/221 |
| 2014/0170493 | A1 * | 6/2014 | Holme | H01M 4/0428 |
| | | | | 429/220 |
| 2015/0037682 | A1 | 2/2015 | Wietelmann et al. | |
| 2015/0180023 | A1 | 6/2015 | Xiao et al. | |
| 2017/0365854 | A1 * | 12/2017 | Gopalakrishnannair | ........... |
| | | | | H01M 10/4235 |
| 2019/0044151 | A1 * | 2/2019 | Elam | C23C 16/45553 |

FOREIGN PATENT DOCUMENTS

| | | | |
|---|---|---|---|
| JP | 11-288706 | A | 10/1999 |
| JP | 2014-127315 | A | 7/2014 |
| JP | 2015-511990 | A | 4/2015 |
| KR | 2002-0091748 | A | 12/2002 |
| KR | 100413796 | B1 * | 1/2004 |
| KR | 10-2008-0076527 | A | 8/2008 |
| KR | 10-2009-0091659 | A | 8/2009 |
| KR | 10-2013-0128273 | A | 11/2013 |
| KR | 10-2014-0018053 | A | 2/2014 |
| KR | 10-2014-0125970 | A | 10/2014 |

OTHER PUBLICATIONS

European Patent Office Search Report dated Aug. 1, 2019 for EP 17891409.9.
International Search Report (PCT/ISA/210) issued in PCT/KR2017/015589, dated May 4, 2018.
European Office Action dated Dec. 19, 2023 for Application No. 17 891 409.9.
Nicholls et al., "Diffusion Coatings", Metallic and Inorganic Coatings, Elsevier, 2010, pp. 2532-2555 (26 pages total).

* cited by examiner

[FIG. 1]
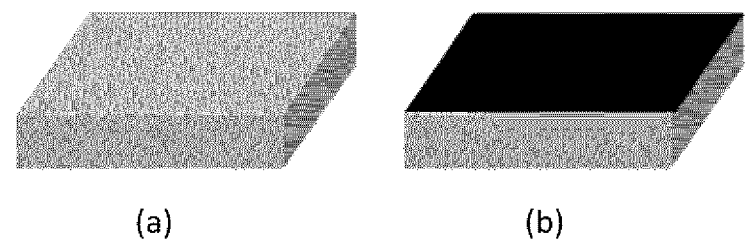
(a)          (b)

[FIG. 2]
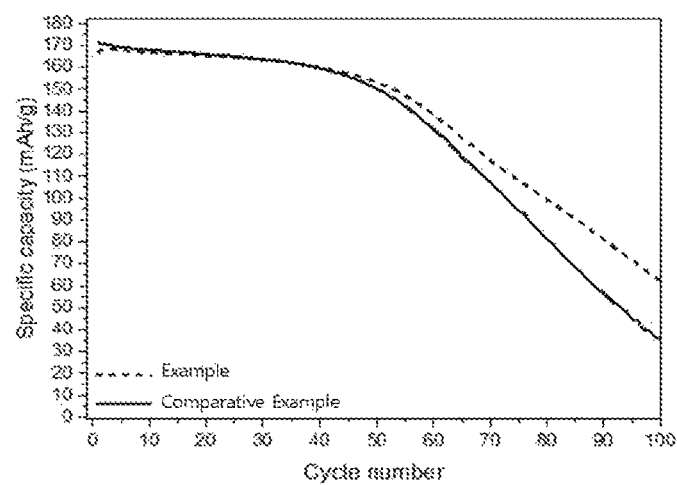

[FIG. 3]
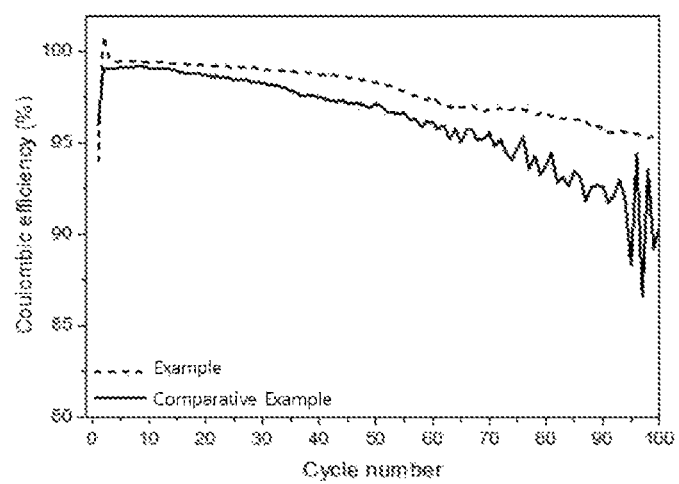

DEPOSITION OF LITHIUM FLUORIDE ON SURFACE OF LITHIUM METAL AND LITHIUM SECONDARY BATTERY USING THE SAME

TECHNICAL FIELD

The present invention relates to a negative electrode of a lithium metal secondary battery and a method of manufacturing the same, and more particularly to a method of depositing lithium fluoride (LiF) on the surface of a lithium metal, which is used as a negative electrode of a lithium metal secondary battery, a lithium metal manufactured by the same, and a negative electrode and a lithium metal secondary battery using the same.

BACKGROUND ART

With the recent weight reduction and performance improvement of portable devices, such as smartphones, laptop computers, tablet PCs, and portable game consoles, the demand for secondary batteries used as driving sources thereof has been changed. In the past, a nickel-cadmium battery, a nickel-hydride battery, and a nickel-zinc battery were used. At present, a lithium secondary battery, which has high operating voltage and high energy density per unit weight, is being used in the greatest numbers.

A material that reversibly stores and releases lithium ion to exhibit high reversible potential, such as $LiCoO_2$, $LiNiO_2$, or $LiMn_2O_4$, is used as the material of a positive electrode of a lithium secondary battery. The positive electrode material is still under development in order to improve the performance and stability of the lithium secondary battery.

A lithium metal, which has highest energy density per unit weight and a standard hydrogen potential of −3.04V, which is the lowest, is most ideally used as the material of a negative electrode of the lithium secondary battery. In the case in which a lithium metal is used as the material of the negative electrode of the lithium secondary battery, it is theoretically possible to obtain a capacity of 3860 $mAhg^{-1}$, which is 10 times or more of the capacities of current commercial batteries. In this case, however, dendrite may easily grow on the surface of the lithium metal, and such dendrite may damage a separator of the battery, whereby the performance and safety of the battery may be reduced. In addition, the precipitated dendrite may abruptly increase the specific surface area and reactivity of the lithium metal, whereby a polymer film having no electrical conductivity may be formed after reaction with an electrolytic solution. Rapid charging, which has been rising in popularity in recent years, makes this effect worse.

In order to solve this problem, a carbon material, such as graphite or carbon, which is usable for a long time, has been mainly used as the negative electrode material. In the case in which the lithium metal is directly used as the negative electrode material, the maximum possible number of charge and discharge cycles is only several tens, which is insufficient for practical application. For this reason, a material that can be used for a long time even though the one-time capacity thereof is small, such as graphite or carbon, has been mainly used. Since the lithium metal is not precipitated, an internal short circuit or additional problems due to dendrite do not occur, whereby stable use for a long time becomes possible. A theoretical lithium storage capacity of the negative electrode material, such as graphite or carbon, is 372 $mAhg^{-1}$, which is equivalent to 10% of that of the lithium metal. Although much effort has been made in order to increase the lithium storage capacity, therefore, it has not greatly exceeded theoretical limitations.

Various attempts to improve the lithium metal to a level sufficient for practical use as a negative electrode material have been made in order to support the performance improvement of portable devices. In particular, various attempts to reform the surface of the lithium metal as a negative electrode material have been made. Patent Document 1 discloses copper as a negative electrode current collector, a lithium metal as a negative electrode active material, and a coating layer, composed of LiF-based particles, formed on the surface of the negative electrode active material. During charging and discharging processes of a battery, a LiF-based coating layer is formed on the surface of a negative electrode due to the side reaction of LiPF6.

Patent Document 2 discloses that a negative electrode active material is a lithium metal and that a LiF protective film is provided on the surface of the negative electrode active material. The surface of the lithium metal is treated using a method such as mechanical etching, chemical etching, electrochemical etching, or plasma etching, and then a polymer film is formed using a polymer containing fluorine. Alternatively, a lithium metal film is treated in a gas atmosphere containing fluorine, such as $CF_4$ or $C_2F_6$, in order to provide an LiF protective film.

Patent Document 3 discloses a method of coating the surface of an electrode of a lithium secondary battery with a fluorine-based gas, such as LiF, using CVD or PVD. In Patent Document 3, however, a negative electrode is $Li_4Ti_5O_{12}$, (LTO), graphite, silicon, or a silicon alloy, rather than a lithium metal, and the coating sequence is as follows: an oxide, such as $Al_2O_3$, $TiO_2$, $SiO_2$, SnO, $VnO_5$, HfO, $ZrO_2$, or ZnO, is coated as a first layer, and then a material such as $AlF_3$ or LiF is coated on the oxide using CVD or PVD.

Patent Document 4 discloses a method of coating LiF on the surface of a negative electrode active material for lithium secondary batteries. However, the negative electrode active material is a carbon-based material, rather than a lithium metal. That is, technology for coating the surface of the lithium metal with LiF through deposition has not been proposed.

[Patent Document 001] Korean Patent Application Publication No. 10-2009-0091659

[Patent Document 002] Korean Patent Application Publication No. 10-2002-0091748

[Patent Document 003] U.S. Patent Application Publication No. 2015/0180023

[Patent Document 004] Korean Patent Application Publication No. 10-2008-0076527

DISCLOSURE

Technical Problem

An object of the present invention is to provide a method of improving the performance of a lithium metal used as a negative electrode material. Another object of the present invention is to improve the reversibility of a lithium metal by depositing lithium fluoride on the surface of the lithium metal.

Technical Solution

In accordance with a first aspect of the present invention, the above and other objects can be accomplished by the provision of a method of reforming the surface of a lithium metal, the method including 1) preparing a lithium metal and 2) depositing lithium fluoride (LiF) on the surface of the lithium metal.

In accordance with a second aspect of the present invention, the deposition may be physical vapor deposition (PVD) or chemical vapor deposition (CVD).

In accordance with a third aspect of the present invention, the method may be performed to reform a lithium metal negative electrode of a lithium metal secondary battery.

In accordance with a fourth aspect of the present invention, a deposition thickness of lithium fluoride may be 0.01 to 1 μm.

In accordance with a fifth aspect of the present invention, there is provided a lithium metal manufactured using the method described above.

In accordance with a sixth aspect of the present invention, there is provided an electrode for secondary batteries including the lithium metal.

In accordance with a seventh aspect of the present invention, there is provided a lithium metal secondary battery including the electrode for secondary batteries.

BRIEF DESCRIPTION OF DRAWINGS

The above and other objects, features and other advantages of the present invention will be more clearly understood from the following detailed description taken in conjunction with the accompanying drawings, in which:

FIG. 1 is a view showing a comparison between a lithium metal (a) and a lithium metal having lithium fluoride (LiF) deposited on the upper surface thereof (b);

FIG. 2 is a graph showing a charging capacity and a discharging capacity measured during charging and discharging processes according to an Example and a Comparative Example; and FIG. 3 is a graph showing charging and discharging efficiencies during the charging and discharging processes according to the Example and the Comparative Example.

BEST MODE

The present invention provides a method of depositing the surface of a lithium metal including the following steps:

1) a step of preparing a lithium metal; and 2) a step of depositing lithium fluoride (LiF) on the surface of the lithium metal.

At step 2), chemical vapor deposition (CVD) or physical vapor deposition (PVD) may be utilized. A lithium metal foil is placed in a chamber for deposition, and then LiF is deposited. The present invention is characterized in that LiF is directly deposited without the use of an additional precursor.

The deposition of LiF on the surface of the lithium metal according to the present invention is distinct from conventional deposition of LiF on a carbon-based material, which is widely used as a negative electrode material. Since the lithium metal exhibits high oxidizing power, the process must be performed in an inactive atmosphere (Ar, etc.) in order to prevent the lithium metal from being oxidized during deposition. Since the lithium metal is easily oxidized even by a small amount of air and moisture, attention must be paid thereto. On the other hand, the oxidizing power of the carbon-based negative electrode material is not high, whereby it is not necessary to pay particular attention thereto even in a normal atmosphere.

In addition, since the lithium metal has a melting point of 180° C., which is lower than the melting points of other metals, it is necessary to carefully adjust the temperature of the chamber for deposition. In order to deposit LiF without melting the lithium metal, it is necessary for the temperature in the chamber to be lower than the melting point of the lithium metal.

Meanwhile, the deposition of LiF according to the present invention is superior to conventional coating using a polymer, including a fluorine compound. In the case in which LiF is formed through charging and discharging disclosed in Patent Document 1, the formation process is complicated, and the lithium metal is consumed during the formation process, whereby the total capacity of the battery is reduced. In the case in which fluorine-containing gas is used, as disclosed in Patent Document 2, the gas is dangerous, and the structure of a device for processing the gas is complicated. In addition, in conventional technologies in which LiF itself is not deposited, a lithium metal, which is used as an electrode, reacts with fluorine. As a result, the lithium metal, which is an electrode material, is consumed, whereby the capacity of the battery is reduced. In the deposition method according to the present invention, it is possible to more easily adjust a thickness than in a conventional coating method. Consequently, it is possible to easily set an optimum thickness based on a positive electrode material, an electrolytic solution, and a separator according to the configuration of the battery.

The deposition thickness according to the present invention is 0.01 to 1 μm, preferably 0.05 to 0.8 μm, and more preferably 0.1 to 0.5 μm.

It is possible to manufacture a secondary battery using the lithium metal according to the present invention as a negative electrode. At this time, materials that are generally used for a lithium secondary battery may be used as a current collector, a positive electrode, a separator, and an electrolytic solution, which correspond to the negative electrode.

EXAMPLE

Hereinafter, the present invention will be described in detail with reference to the following Example and Experimental Example; however, the present invention is not limited by the Example and the Experimental Example. The Example may be modified into various other forms, and the scope of the present invention should not be interpreted as being limited by the Example, which will be described in detail. The Example is provided in order to more completely explain the prevent invention to a person who has average knowledge in the art to which the present invention pertains.

<Deposition of LiF on the Surface of a Lithium Metal>

LiF was applied to a lithium metal foil through physical vapor deposition (PVD). For deposition, LiF powder, as a raw material, was put into a deposition device (e.g. a thermal evaporator manufactured by Sunic System, Korea), and was evaporated at a temperature of 800° C. for one hour through thermal evaporation in order to deposit an LiF layer having a thickness of 100 nm on the lithium metal foil, whereby a lithium metal foil having LiF deposited on the surface thereof was manufactured.

<Manufacture of a Lithium Secondary Battery>

96 weight % of $LiCoO_2$ as a positive electrode active material, 2 weight % of Denka black (a conductive agent), and 2 weight % of polyvinylidene fluoride (PVDF) (a binder) were added to N-methyl-2-pyrrolidone (NMP) in order to manufacture a positive electrode material slurry. The manufactured positive electrode material slurry was coated on one surface of an aluminum current collector such that the positive electrode material slurry had a thickness of 65 μm. The positive electrode material slurry was dried, and the aluminum current collector was rolled. Subsequently, the aluminum current collector was punched so as to have a predetermined size, whereby a positive electrode was manufactured.

A lithium metal foil (150 μm), having LiF deposited thereon to a thickness of 100 nm through physical vapor deposition (PVD), was used as a counter electrode. A polyolefin-based separator was interposed between the positive electrode and the counter electrode, and an electrolytic solution, in which 1M LiPF6 was dissolved in a solvent obtained by mixing ethylene carbonate (EC) and ethyl methyl carbonate (EMC) at a volume ratio of 50:50, was injected into the electrode assembly in order to manufacture a coin-type half battery.

<Charging and Discharging>

The coin-type half battery, manufactured as described above, was charged and discharged using an electrochemical charging and discharging device. Charging was performed until the voltage of the coin-type half battery became 4.4 V vs. Li/Li$^+$, and discharging was performed until the voltage of the coin-type half battery became 3.0 V vs. Li/Li$^+$. At this time, the current density was 0.5 C-rate.

Comparative Example

A coin-type half battery was manufactured in the same manner as in the Example except that a non-treated lithium metal foil was used as a counter electrode, in place of the lithium metal foil (150 μm), having LiF deposited thereon to a thickness of 100 nm, according to the Example, and the coin-type half battery was charged and discharged under the same conditions as in charging and discharging according to the Example.

Experimental Example 1: Electrochemical Charging and Discharging Performance

A charging capacity and a discharging capacity were measured during charging and discharging processes according to the Example and the Comparative Example. The results are shown in FIG. 2. The charging and discharging efficiencies at that time are shown in FIG. 3.

Referring to FIG. 2, the cycle performance of the Example and the cycle performance of the Comparative Example are similar to each other in the early cycles; however, the cycle performance of the Example and the cycle performance of the Comparative Example are very different from each other after 50 cycles. It can be seen that the Example exhibits better performance than the Comparative Example and that the difference in the performance between the Example and the Comparative Example becomes greater as the number of cycles is increased.

Referring to FIG. 3, it can be seen that the Example exhibits higher charging and discharging efficiency than the Comparative Example even in the early cycles.

As described above, it can be seen that, in the case in which the lithium metal having LiF deposited thereon is used, it is possible to remarkably improve charging and discharging efficiency of the battery.

INDUSTRIAL APPLICABILITY

In the case in which a lithium metal is used in order to increase the capacity of a lithium secondary battery, reversibility of charging and discharging is reduced due to dendrite, etc. According to the present invention, a lithium metal having LiF deposited thereon exhibits high stability, whereby reversibility of charging and discharging is increased. In addition, in the case in which LiF is deposited, it is possible to easily adjust a deposition thickness and to form a more uniform film than when using a conventional coating method. Meanwhile, the lithium metal, which is a negative electrode material, is not consumed, and the shape of a lithium metal electrode is not greatly changed.

The invention claimed is:

1. A method of reforming a surface of a lithium metal foil for an electrode having no substrate, the method consisting of:
   1) Preparing a lithium metal foil not on a substrate having a thickness of at least 150 μm; and
   2) depositing lithium fluoride (LiF) on a surface of the lithium metal foil,
   wherein the deposition is physical vapor deposition (PVD) performed at 800° C. by evaporating LiF powder,
   wherein LiF is directly deposited on the lithium metal foil without an additional precursor,
   wherein the method is performed to reform a lithium metal negative electrode of a lithium secondary battery, and
   wherein a deposition thickness of lithium fluoride is 0.5 μm to 1 μm.

2. A lithium metal foil manufactured using a method according to claim 1.

3. An electrode for secondary batteries comprising a lithium metal foil according to claim 2.

4. The electrode according to claim 3, wherein the electrode is a negative electrode.

5. A secondary battery comprising an electrode for secondary batteries according to claim 3.

6. The secondary battery according to claim 5, wherein the electrode is a negative electrode, and the secondary battery is a lithium metal secondary battery.

* * * * *